April 14, 1953

T. CARROLL 2,634,573

PICKUP HAY BALER

Filed June 15, 1950

INVENTOR.
THOMAS CARROLL
BY
*A.S.Kroh*
ATTORNEY

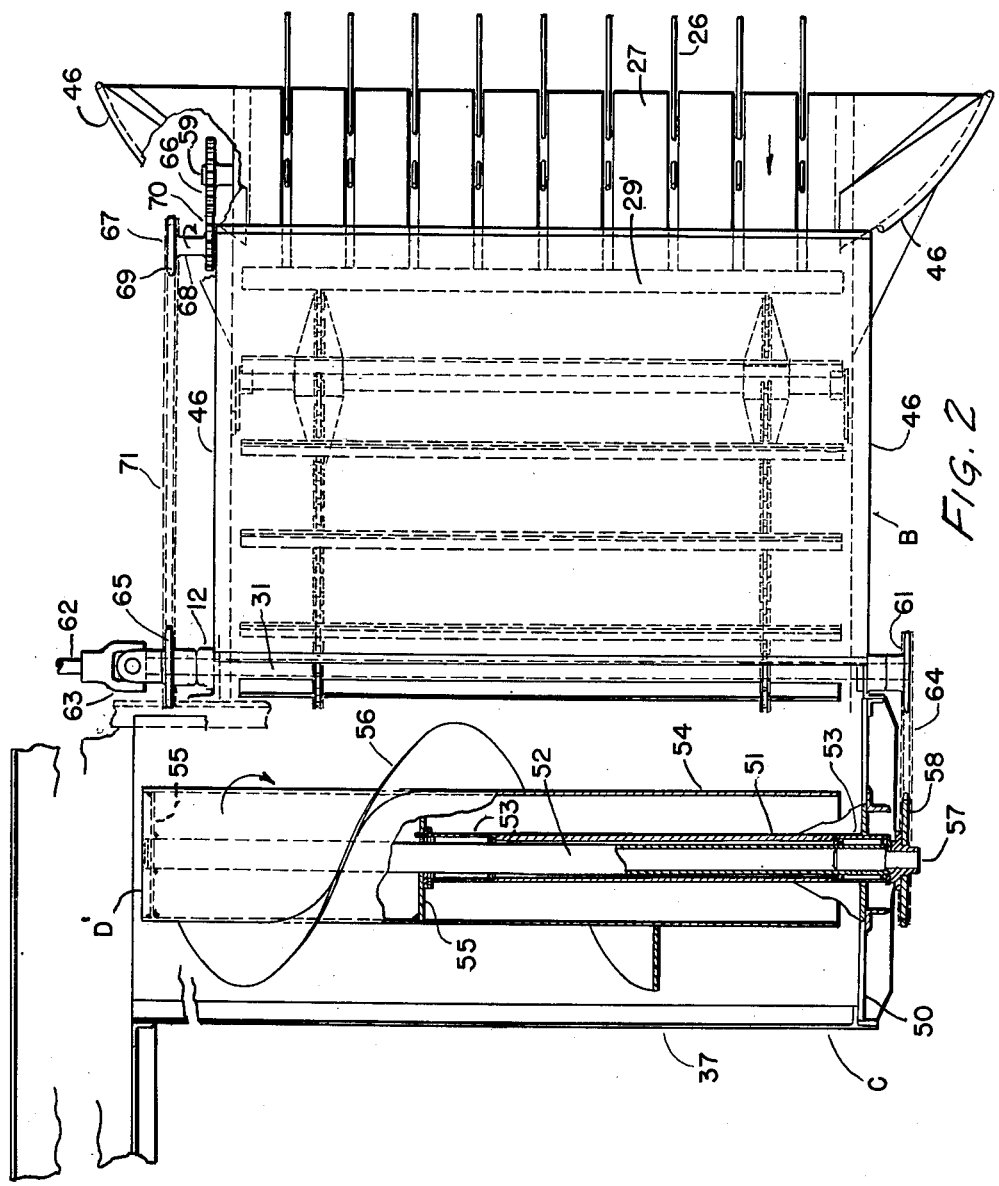

Patented Apr. 14, 1953

2,634,573

UNITED STATES PATENT OFFICE 2,634,573

PICKUP HAY BALER

Thomas Carroll, Toronto, Ontario, Canada

Application June 15, 1950, Serial No. 168,261

1 Claim. (Cl. 56—355)

The present invention relates to an improved device for pick up hay balers and has for its objects an improved method for lifting the hay from the ground and conveying it to a feeding mechanism which is adapted to deliver the hay to the inlet or well of the baler.

Objects of the present invention generally stated, are to provide a simple device which can be manufactured at low cost, is durable and efficient and operates at maximum efficiency.

An object of the present invention is to pick up the hay, convey it to the feeding mechanism and to the well of the baler with minimum agitation of the hay so as not to loosen the leaves from the stalks and provide a device which under any condition of the hay will not clog but will move the hay to the well of the baler in an even stream as it encounters the swath.

To these and other useful ends, my invention consists of parts, combinations of parts or their equivalents and mode of operation as hereinafter described and claimed and shown in the accompanying drawings in which:

Fig. 2 is a top view of the device shown in Figuse 1 partially in section.

Figure 1:
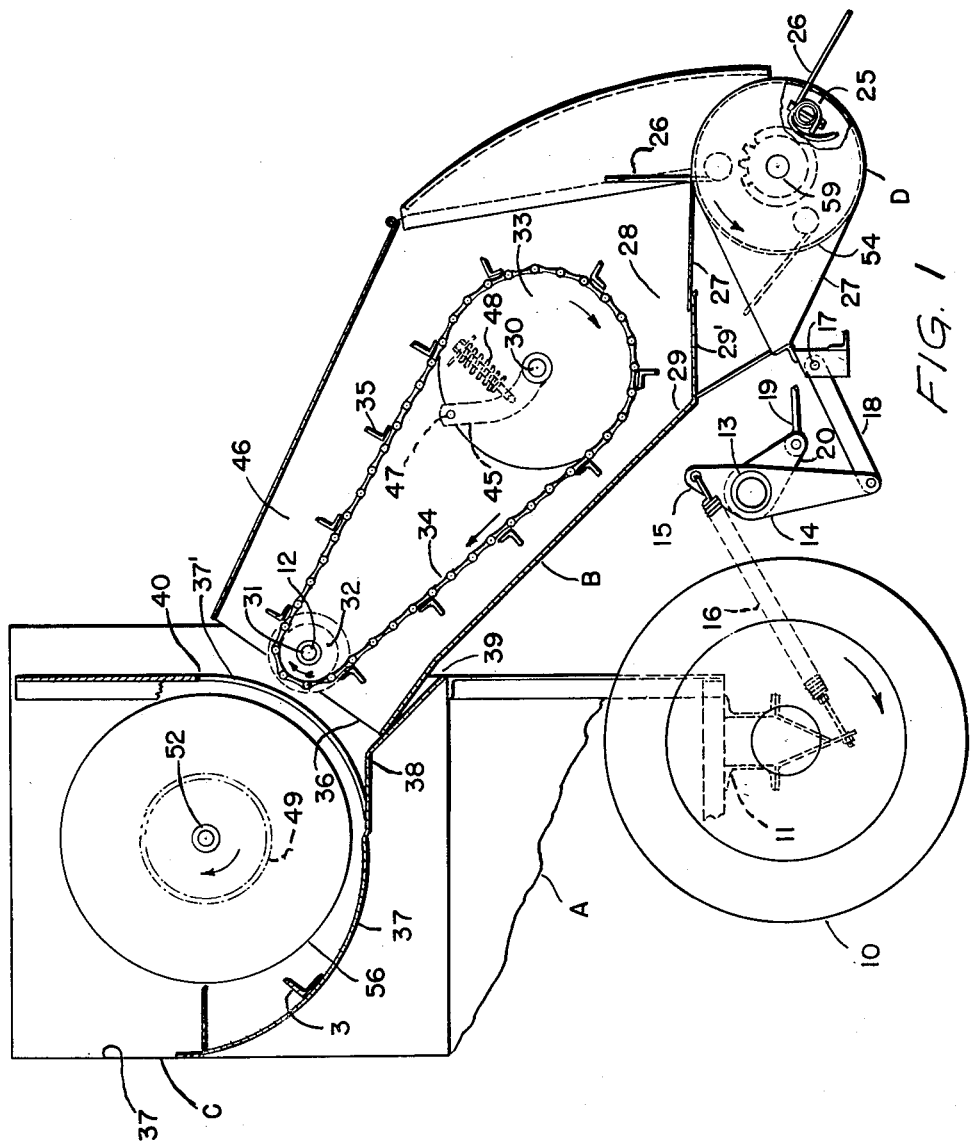
Fig. 1 is a side elevational view of my device partially in section.

My device is adapted to serve what is commonly called a pick up hay baler generally pulled by a tractor and is mounted on a wheel carried frame having a tractor hitch for the purpose, the frame A of the device having preferably rubber equipped carrying wheels 10 rotatably mounted on an axle frame 11. A pick up and elevating device is designated in its entirety by reference character B and the transverse conveyor is in its entirety designated by reference character C. Member C is adapted to receive the hay from member B and move it into a conventional well or inlet of a baler which is positioned at the outlet end of member C at D'.

The front end of member B is adapted to be moved vertically preferably by means of a hand operated lever (not shown) on an axis as at 12 as will hereinafter appear. The means for supporting and moving the front end of member B comprises preferably a tube 13 which is rotatably secured to frame A, the tube being positioned under member B and having rotatably mounted thereon a depending arm 14 having a vertically extending arm 15 which is preferably an integral part of member 14. The upper end of member 15 is suitably connected to member 11 by means of a pull spring 16. The lower end of arm 14 being connected to member B at 17 by means of a link 18. Thus spring 16 will be caused to substantially balance the weight of the front end of member B. A manually operated lever (not shown) is mounted on member A having a latch and a sector and a link 19 which at its rear end is operatively connected to a lever 20, which is suitably rigidly connected to tube 13. Thus by operating the lever, the front end of member B may be adjusted to any desired distance from the ground. It will be understood however that the front end of member B may be wheel or skid carried, for causing the front end of the pick up device to follow the contour of the ground.

It will be understood that tube 13 may be rigidly mounted on frame A and members 14, 15 and 20 may then be operatively connected together and rotatably mounted on the tube.

I will now describe the means used for picking up the hay from the ground and feeding it to member C. A pick up cylinder D is rotatably mounted on the forward end of the frame of member B and is turned in the direction indicated by a curvilinear arrow by means which will hereinafter be described.

Cylinder D is provided with a suitable number of circumferentially spaced rotatably mounted tubes 25, each having mounted thereon in spaced relation a number of yielding fingers 26. Well known means are provided for controlling the position of these fingers so they are in the right position for engaging and lifting the hay as they travel forward, upward and rearward for a short distance and then as they travel rearward and downward the hay is deposited into the elevator inlet 28 formed by bars 27 and ledge 29', this ledge being an extension of elevator plate 29. The upper ends of bars 27 are secured to ledge 29' as indicated.

The undershot elevator operating parts comprise shafts 30 and 31, member 31 being the driving shaft. Sprockets 32—32 and 33—33 are secured to shafts 30 and 31. Chains 34—34 are mounted on sprockets 32 and 33 having spaced flights 35 secured to certain links of the chains. Thus when the sprockets are turned in the direction indicated by curvilinear arrows, the hay discharged in inlet 28 of the undershot elevator will be engaged and moved to the outlet 36 of the undershot elevator where it will be engaged and conveyed to the well of the bailing device.

Means are provided whereby the front end of the undershot elevator may yieldingly ride over the hay, that is shaft 30 is mounted so it can raise and fall depending upon the bulk of hay being handled. For the purpose, I provide each bearing of shaft 30 with an arm 45 which is pivoted to the side walls 46 of member B as at 47. Thus shaft 30 may raise and fall on members 47 as axes. A spring 48 may be provided for partially counterbalancing the weight of the front end of the elevator or if necessary this spring may be used for yieldingly adding weight to the front end of the elevator, which is shown in Figure 1 as being in its lowest position.

Member C comprises a trough 37 which is opened at its front side as at 37' for the reception of the hay. The wall 37 of trough C extends downwardly and forwardly as at 38 terminating as at 39 thus defining the lower side of inlet 36. The upper side of this inlet terminates preferably as at 40. The right hand end 50 of trough C has secured thereto a tube 51. Another tube 52 is rotatably mounted in both ends of tube 51 as at 53—53. A worm drum 54 is secured to the protruding end of tube 52 by means of plates 55—55. Auger flight 56 is secured to tube 54 for the length of the tube and shaped so the hay is engaged and moved into well D' of the baler. A stub shaft 57 is secured in the right hand end of tube 52, on the outer end of which is mounted a sprocket 58.

I will now describe the driving means for shafts 57, 31 and 59. A sprocket 61 is mounted on the outer end of shaft 31. Shaft 31 is driven in the direction indicated by curvilinear arrow by means of a shaft 62 through a universal joint 63. A chain 64 forms an operating connection between sprockets 58 and 61. Universal joint 63 is provided with a sprocket 65. A gear 66 is mounted on the inner end of drum shaft 59. A shaft 67 is secured to the frame of member B having rotatably mounted thereon a sleeve 68 having mounted on its outer end a sprocket 69 and on its inner end a pinion 70 which meshes gear 66. A chain 71 forms an operating connection between sprockets 65 and 69. Thus it will be seen that shaft 62 will drive drum 54, sleeve 68 and shaft 59 as indicated by curvilinear arrows so the hay will be picked up from the ground by fingers 26 and moved into inlet 28 of the undershot elevator; that the undershot elevator will move the hay into the trough of member C and the auger flights 56 will then engage the hay and move it into well D' of the baler.

Thus the hay will be moved into the well in a steady stream as it is picked up by the fingers so that a minimum of leaves will be loosened from the stalks and the hay will not have a chance to hesitate or clog during its path from the ground to the well of the baler and that these operations will be performed smoothly and efficiently by a minimum number of operating parts and that the length of passage of the hay from the time it is picked up until it is delivered into the well of the baler, is reduced to a minimum; that during this passage of the hay, it will not be unnecessarily agitated.

Clearly detail changes may be made in the design shown without departing from the spirit and scope of my invention as recited in the appended claim.

Having thus shown and described my invention, I claim:

In a baler having a receiving well, a pick up and feeding mechanism for said well comprising; a transversely positioned auger conveyor adapted to feed material into said well; an undershot elevator having the discharge end closely adjacent the lower forward portion of the auger and comprising a pair of large resiliently mounted sprockets at the forward end thereof; a pick up device of substantially the same width as the elevator and having crop engaging fingers, said device positioned substantially forwardly and beneath said sprockets and adapted to deliver material directly to the forward and lower portion of said elevator.

THOMAS CARROLL.

References Cited in the file of this patent

UNITED STATES PATENTS

| Number | Name | Date |
|---|---|---|
| 938,252 | Laughlin | Oct. 26, 1909 |
| 2,157,261 | Innes | May 9, 1939 |
| 2,347,907 | Hill | May 2, 1944 |
| 2,421,037 | Ronning | May 27, 1947 |
| 2,450,082 | Crumb | Sept. 28, 1948 |
| 2,464,684 | Hill | Mar. 15, 1949 |
| 2,498,319 | Vutz et al. | Feb. 21, 1950 |
| 2,524,233 | Russell | Oct. 3, 1950 |
| 2,529,180 | Oehler | Nov. 7, 1950 |